Patented Oct. 20, 1925.

1,557,571

UNITED STATES PATENT OFFICE.

CARLETON ELLIS, OF MONTCLIAR, NEW JERSEY.

KETO-ALCOHOL RESIN AND PROCESS OF MAKING THE SAME.

No Drawing. Application filed February 27, 1922. Serial No. 539,763.

*To all whom it may concern:*

Be it known that I, CARLETON ELLIS, a citizen of the United States, and a resident of Montclair, in the county of Essex and State of New Jersey, have invented certain new and useful Improvements in Keto-Alcohol Resins and Processes of Making the Same, of which the following is a specification.

This invention relates to a synthetic resin made from primary alcohols containing a ketone group, or from compounds of an equivalent character and relates especially to resins which are capable of setting on heating to a substantially infusible or heat resistant mass.

The resin may be prepared in a form soluble in organic solvents or one which is insoluble in these, or one which is both insoluble and substantially infusible depending on the extent of the conversion.

As an illustration I may make use of keto butyl alcohol, $CH_3.CO.CH_2.CH_2OH$. This is a thick liquid which on standing has a tendency to thicken somewhat probably by formation of polymers or other reaction products. It will react in the presence of caustic soda or caustic potash on heating to form an infusible resinous product. The action is very rapid if a considerable amount of the caustic alkali is present.

This keto butyl alcohol may be used as a flux or solvent for other resins and if caustic alkali is present on heating the keto butyl alcohol will set to a resin thereby causing the whole mass to become converted into a hard solid substance.

The liquid alcohol may be mixed with fillers such as asbestos and mineral powders, zinc oxide, mica etc. or organic fillers such as wood flour or fine sawdust and on pressing into shape and heating the mass will solidify to a molded product.

The activity of the caustic alkali as a catalyst is so great that when the thickish liquid mass which is produced when the keto butyl alcohol has stood for some time is warmed on a hot plate to a thin liquid and a drop of alcoholic potash is applied to one portion it sets almost instantly to an infusible resin.

Since keto butyl alcohol and its immediate derivatives are of a liquid or viscous character they may be readily mixed with fillers for molding operations without the use of any solvent or thinner. Also because of the remarkable effect of caustic alkali on bodies of this type the temperatures required for molding need not be so great or the time of molding can be reduced from many minutes to a few seconds in case higher temperatures are used. This means a considerable saving in labor cost of molding.

The resin may also be formed in molds without filler to produce an amber substitute.

The amount of caustic soda or caustic potash to be added to the keto butyl alcohol is a variable quantity depending on the speed of heat-setting desired. Less than one per cent will have an effect and from one per cent up to several per cent there will be increasing speed of heat-setting in some measure proportionate to the amount of catalyst present.

Carbonated alkali and the milder forms of alkali such as sodium phosphate, borax and the like are not well suited for the rapid conversion desired but may be used when slow setting is not objectionable.

Quick setting has an advantage in respect to color as the protracted action of heat is liable to cause a greater degree of darkening than is the case with short exposure.

In addition to the keto butyl alcohol the ketone alcohol corresponding to acetone, that is $CH_3.CO.CH_2OH$ may be used also various derivatives of ketone alcohols of this type containing three or four carbon atoms and upwards. However for good reactivity an alcohol having the hydroxyl group in the primary or alpha position and the ketone group in the gamma position is desirable.

Diacetone alcohol reacts with caustic soda to form a resinous substance which does not have equivalent heat-setting properties.

What I claim is:—

1. A resin prepared by reacting with a caustic alkali on keto butyl alcohol.

2. A method of forming a resin which comprises reacting on keto butyl alcohol with caustic alkali at a temperature sufficient to cause heat-setting.

3. A method of making resin which comprises heating a keto alcohol and caustic alkali.

4. A heat-set resin from a keto alcohol and alkali.

5. A molding composition comprising a heat-set keto alcohol resin.

6. A molding composition comprising a heat-set keto butyl alcohol.

CARLETON ELLIS.